(12) United States Patent
Goto et al.

(10) Patent No.: US 6,289,029 B1
(45) Date of Patent: Sep. 11, 2001

(54) SOLID STATE LASER

(75) Inventors: Chiaki Goto; Hideo Miura, both of Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/160,347

(22) Filed: Sep. 25, 1998

(30) Foreign Application Priority Data

Sep. 26, 1997 (JP) .................................................. 9-262066

(51) Int. Cl.⁷ ........................................................ H01S 3/10
(52) U.S. Cl. .................................. 372/32; 372/33; 372/36
(58) Field of Search ................................. 372/22, 29.02, 372/32, 34, 33

(56) References Cited

U.S. PATENT DOCUMENTS 5,671,232 * 9/1997 Lee et al. ................................ 372/22
5,696,781 * 12/1997 Hyuga ..................................... 372/22

FOREIGN PATENT DOCUMENTS 62-189783  8/1987  (JP) .............................. H01S/3/109
9-266337  10/1997  (JP) .............................. H01S/3/094

* cited by examiner

Primary Examiner—James W. Davie
(74) Attorney, Agent, or Firm—Sughrue, Mion, Zinn Macpeak & Seas, PLLC (57) ABSTRACT

A solid state laser includes a solid state laser crystal, a pumping source for pumping the laser crystal, a resonator, an enclosed casing which is filled with gas and in which the resonator is contained, and a temperature controller which keeps the resonator at a predetermined temperature. The ratio of the optical length of the gas layer in the resonator to the oscillation wavelength of the solid state laser is set to be not larger than 13600.

8 Claims, 8 Drawing Sheets

SOLID STATE LASER

BACKGROUND OF THE INVENTION

1. Field of the Invention

This invention relates to a solid state laser such as a laser diode-pumped solid state laser, and more particularly to a solid state laser in which fluctuation in the oscillation wavelength and/or the output power due to change in the length of the resonator is prevented.

2. Description of the Related Art

As disclosed, for instance, in Japanese Unexamined Patent Publication No. 62(1987)-189783, there has been known a solid state laser in which a solid state laser medium doped with a rare earth metal such as neodymium is pumped by a laser beam emitted from a semiconductor laser or the like.

In such a laser diode-pumped solid state laser, the oscillation wavelength is shifted toward the longer wavelength side as the environmental temperature becomes higher and toward the shorter wavelength side as the environmental temperature becomes lower, which changes the optimal drive condition of the laser, e.g., the temperature to which the temperature of the resonator is to be controlled, and causes fluctuation in the output power of the laser.

In order to overcome this problem, the applicant has proposed to contain the solid state laser crystal, the resonator and the like in an enclosed casing which is filled with gas the refractive index of which is closer to 1 than air or which is evacuated to lower than the atmospheric pressure. See Japanese Unexamined Patent Publication No. 9(1997)-266337.

Though these approaches can overcome the problem described above, the former is disadvantageous in that the manufacturing cost is increased and the latter is disadvantageous in that the properties of the solid state laser vary as the state of parts about the resonator varies from the time the casing is sealed to the time the solid state laser is assembled and adjusted.

SUMMARY OF THE INVENTION

In view of the foregoing observations and description, the primary object of the present invention is to provide a solid state laser which can be manufactured at low cost and in which fluctuation in the oscillation wavelength and/or the output power due to change in the environmental temperature can be surely prevented.

In accordance with a first aspect of the present invention, there is provided a solid state laser comprising a solid state laser crystal, a pumping source for pumping the laser crystal, a resonator, an enclosed casing which is filled with gas and in which the resonator is contained, and a temperature control means which keeps the resonator at a predetermined temperature, wherein the improvement comprises that the ratio of the optical length of the gas layer in the resonator to the oscillation wavelength of the solid state laser is not larger than 13600.

Preferably the ratio is not larger than 6800 and more preferably not larger than 3400.

In accordance with a second aspect of the present invention, there is provided a solid state laser comprising a solid state laser crystal, a pumping source for pumping the laser crystal, a resonator, an enclosed casing which is filled with gas and in which the resonator is contained, and a temperature control means which keeps the resonator at a predetermined temperature, wherein the improvement comprises a cover which is provided in the enclosed casing and envelops at least the resonator and at least 80% of the gas in the enclosed casing.

In accordance with a third aspect of the present invention, there is provided a solid state laser comprising a solid state laser crystal, a pumping source for pumping the laser crystal, a resonator, an enclosed casing which is filled with gas and in which the resonator is contained, and a temperature control means which keeps the resonator at a predetermined temperature, wherein the improvement comprises that at least the optical elements forming the resonator are fixed to a support member of aluminum or aluminum alloy in the enclosed casing.

In accordance with a fourth aspect of the present invention, there is provided a solid state laser comprising a solid state laser crystal, a pumping source for pumping the laser crystal, a resonator, an enclosed casing which is filled with gas and in which the resonator is contained, and a temperature control means which keeps the resonator at a predetermined temperature, wherein the improvement comprises that the temperature control means comprises a Peltier element fixed to a bottom plate of the enclosed casing, and the portion of the bottom plate at which the Peltier element is fixed to the bottom plate is not larger than 3 mm in thickness.

Figure 7:
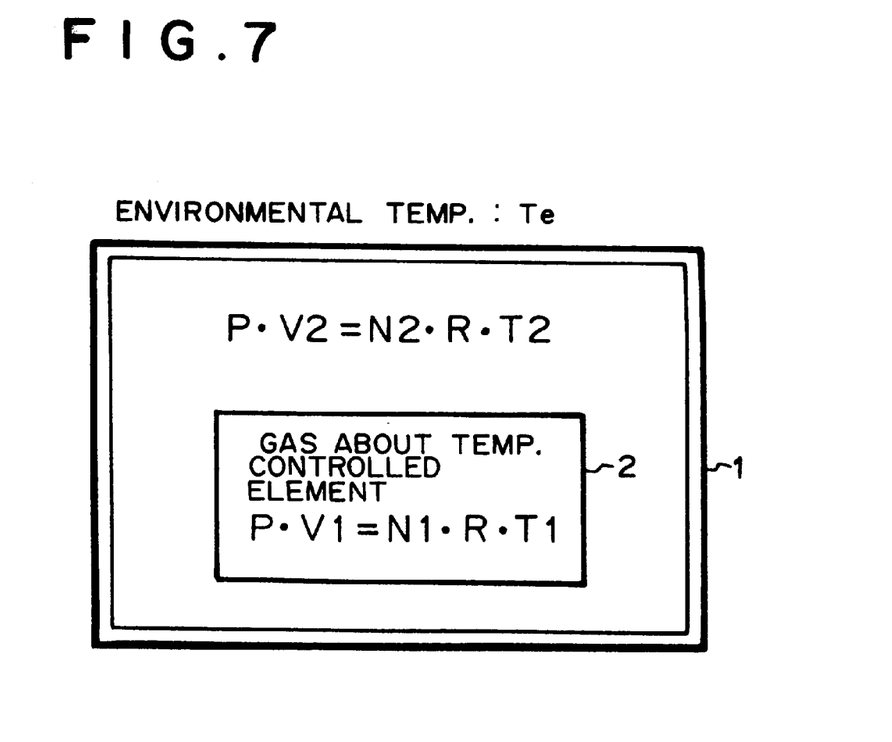
FIG. 7 is a schematic view showing a model of a state of gas in the resonator.

The reason why the oscillation wavelength of a solid state laser varies according to the environmental temperature Te will be discussed in detail, hereinbelow. For this purpose, a model shown in FIG. 7 is imagined. In FIG. 7, reference numeral 1 denotes an enclosed casing which keeps hermetic the inside thereof from the exterior and reference numeral 2 denotes the gas around the temperature controlled optical elements. In the following description, the volume and the number of particles of the enclosed gas near the temperature controlled part are respectively represented by V1 and N1, the volume and the number of particles of the enclosed gas near the wall surface of the casing 1 are respectively represented by V2 and N2, and the pressure of the gas and the gas constant are respectively represented by P and R.

Since the wall surface of the enclosed casing 1 is substantially at the environmental temperature Te, the temperature of the enclosed gas near the wall surface is T2 close to the environmental temperature Te. On the other hand, the temperature of the enclosed gas near the temperature controlled elements is T1 close to the controlled temperature Tc. For example, if the environmental temperature Te is higher than the controlled temperature Tc, Te≈T2>T1≈Tc.

When Te=Tc and there is no temperature distribution, the enclosed gas is distributed uniformly and accordingly, the particle density in the casing 1 is N0/V0 (the number of the whole particles/the volume of the casing 1) and constant. When Te≠Tc assuming that V2=V1 for the purpose of simplicity of description, the particle density of the enclosed gas near the temperature controlled part is N1/V1=P/R/T1 and the particle density of the enclosed gas near the wall surface is N2/V2=P/R/T2.

Accordingly when the environmental temperature Te is higher than the controlled temperature Tc, the particle density of the enclosed gas in the resonator is increased and the refractive index of the gas in the resonator increases, whereby the oscillation wavelength becomes longer.

The relation between the optical length lgas of the gas layer in the resonator and the oscillation wavelength will be described next. When the refractive index of the gas in the resonator is represented by ngas and the optical length of the resonator is represented by L, $$L=\Sigma(ni \cdot li)=n\text{gas} \cdot l\text{gas}+L0.$$

The oscillation wavelength $\lambda=2L/m0$
wherein $m0$ represents the order of the longitudinal mode. Change in the oscillation wavelength with change in the refractive index of the gas layer is as follows.

$$\partial\lambda/\partial n\text{gas}=2 \cdot l\text{gas}/m0=l\text{gas} \cdot \lambda/L$$

The proportion of the change in the oscillation wavelength to the separation between longitudinal modes ($=\Delta\lambda LM=\lambda^2/2L$) is $2 \cdot l\text{gas}/\lambda$ and is proportional to the optical length lgas of the gas layer.

Figure 8A:
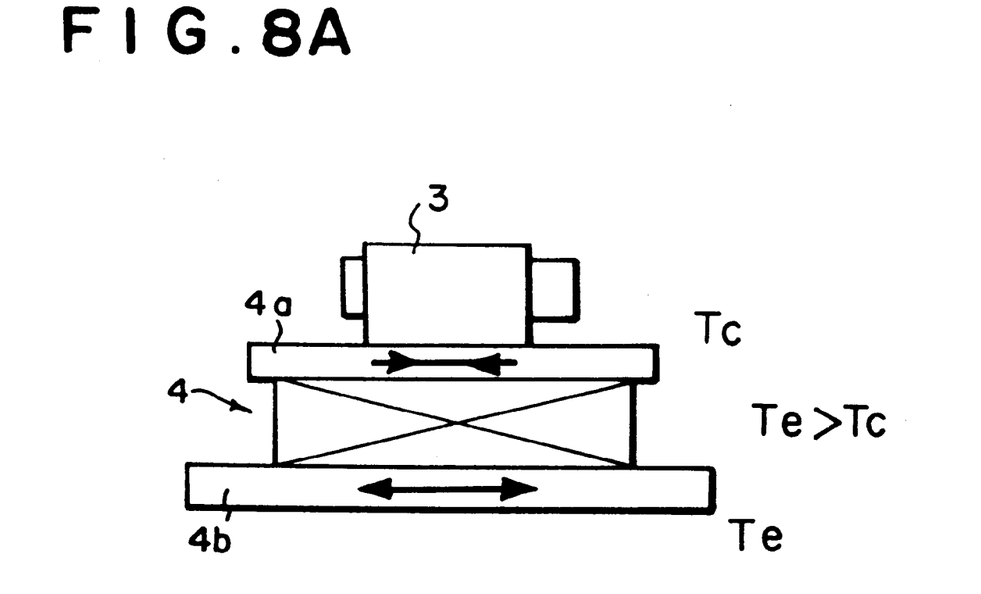
FIGS. 8A and 8B are schematic views for illustrating change in the length of the resonator according to the temperature distribution in the part to which the resonator is fixed.
Figure 8B:
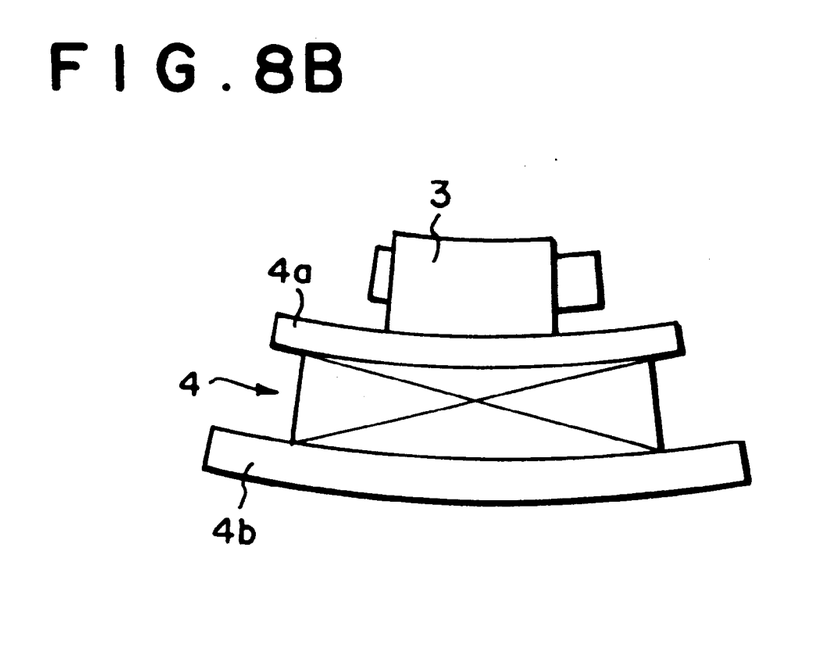

Now change in the length of the resonator according to the temperature distribution in the part to which the resonator is fixed will be described with reference to FIGS. 8A and 8B. In FIGS. 8A and 8B, reference numeral 3 denotes a resonator portion and reference numeral 4 denotes, for instance, a Peltier element for controlling the temperature of the resonator portion 3.

Generally, the upper portion 4a of the Peltier element 4 where the resonator portion 3 is fixed is held at the controlled temperature Tc while the lower portion 4b of the Peltier element 4 is at the environmental temperature Te. When the environmental temperature Te is higher than the controlled temperature Tc, deformation of the Peltier element 4 where the upper portion 4a is contracted while the lower portion 4b is expanded as shown in FIG. 8B takes place. When such deformation takes place, the resonator is shortened and the oscillation wavelength becomes shorter. To the contrast, when the environmental temperature Te is lower than the controlled temperature Tc, the resonator is extended and the oscillation wavelength becomes longer. The change in the oscillation wavelength due to the deformation is reverse to that due to change of the refractive index of the enclosed gas, and accordingly by controlling the amount of deformation, change in the oscillation wavelength can be suppressed.

Figure 9A:
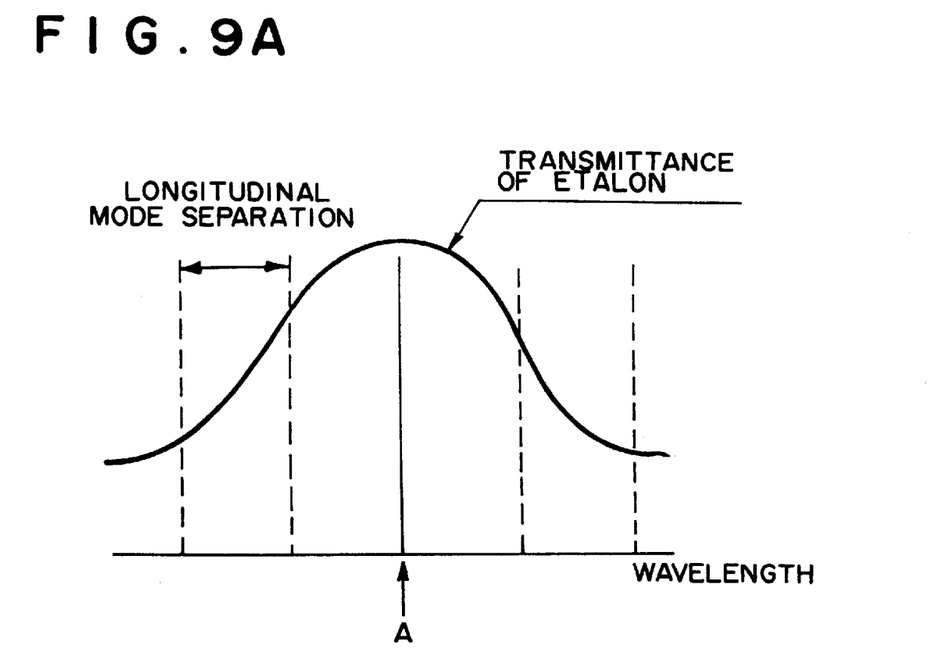
FIGS. 9A and 9B are schematic views for illustrating influence of change in the length of the resonator on the oscillation wavelength.

Now description will be made on influence of change in the length of the resonator on the oscillation wavelength will be made. FIG. 9A shows the transmittance of the etalon versus wavelength. The separation between longitudinal modes is represented by $\Delta\lambda LM=\lambda^2/2L$ as described above, and a longitudinal mode closest to the wavelength (indicated at A) at which the transmittance of the etalon is maximized selectively oscillates.

Figure 9B:
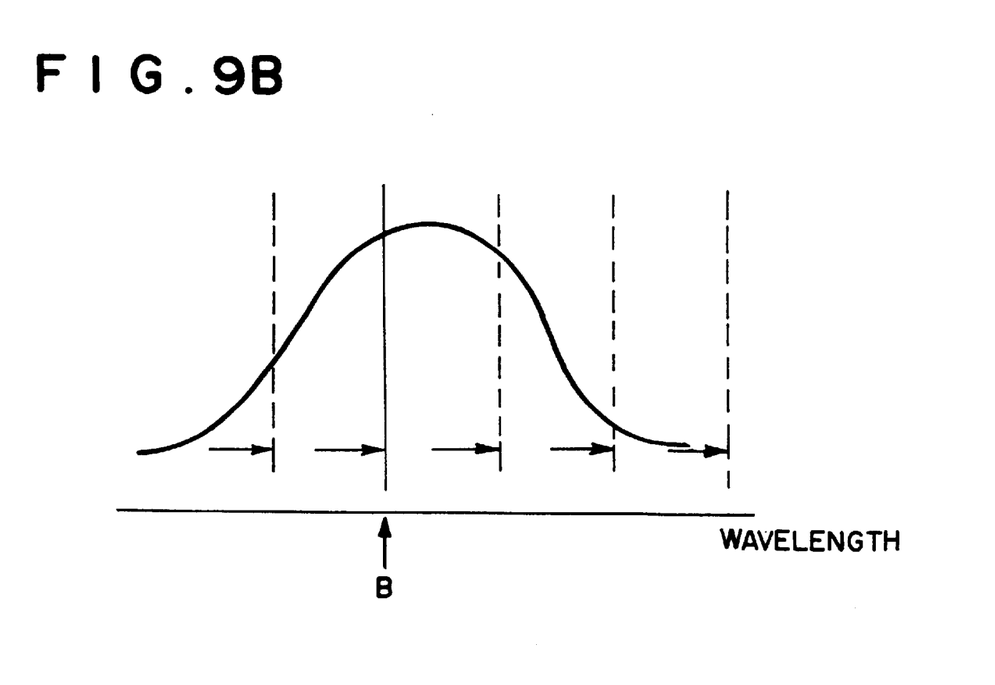

When the refractive index of the gas layer is increased, or the length of the resonator is increased due to deformation of the Peltier element and the like, each longitudinal mode is shifted toward a longer wavelength side and, for instance, a longitudinal mode indicated at B comes to be closest to the wavelength (indicated at A) at which the transmittance of the etalon is maximized in place of the longitudinal mode indicated at A and comes to oscillate. Accordingly, even if the solid state laser oscillates at a desired wavelength in the initial state, the oscillation wavelength can hop when change in the refractive index of the gas layer or the length of the resonator is such that the oscillation wavelength changes by a value not smaller than 50% of the separation between the longitudinal modes.

Though the above description was made on the case where the oscillation mode is made of a single longitudinal mode by the etalon for the purpose of simplicity of understanding, the oscillation wavelength varies for the same reason also in a solid state laser where the oscillation mode is controlled by use of other means such as birefringent crystal, polarization or the like or by utilization of gain width or absorption thickness of a laser crystal and the reason can be understood by substituting resonator loss or wavelength-dependency of gain for the transmittance curve of the etalon described above. In the case of multiple mode oscillation, change in the refractive index of the gas layer or the length of the resonator such that the oscillation wavelength changes by a value not smaller than 50% of the separation between the longitudinal modes will also causes hop of the oscillation wavelength for the similar reason though more complicated.

Thus it will be understood that it is at least necessary to suppress change in the oscillation wavelength with change in the environmental temperature to less than 50% of the separation between the longitudinal modes. However since it is not sure that the original drive condition is set at the middle of adjacent two longitudinal modes, it is preferred that change in the oscillation wavelength with change in the environmental temperature be suppressed to not larger than ±25% of the separation between the longitudinal modes. As the environmental temperature range, 40° Cpp is taken for indoor use and 80° Cpp is taken for outdoor use.

When taking into account also change with time of the resonator such as looseness of optical elements and fifty-fifty margins are allotted to change with time of the resonator and change in the environmental temperature, it is preferred that change in the oscillation wavelength with change in the environmental temperature be suppressed to not larger than ±12.5% of the separation between the longitudinal modes.

Thus in accordance with the first aspect of the present invention, by setting the ratio of the optical length of the gas layer in the resonator to the oscillation wavelength of the solid state laser to be not larger than 13600, change in the oscillation wavelength with change in the environmental temperature by 40° Cpp is suppressed to not larger than ±25% of the separation between the longitudinal modes.

Further since change in the oscillation wavelength with change in the environmental temperature is proportional to the optical length of the gas layer in the resonator as described above, change in the oscillation wavelength with change in the environmental temperature by 40° Cpp is suppressed to not larger than ±12.5% of the separation between the longitudinal modes by setting the ratio to be not larger than 6800 and to not larger than 6.25% by setting the ratio to be not larger than 3400.

Since setting the optical length of the gas in the resonator to a particular value does not add to cost unlike filling the casing with a particular gas, the solid state laser can be manufactured without substantially increasing the cost.

In accordance with the second aspect of the present invention, by virtue of the cover which is provided in the enclosed casing and envelops at least the resonator and at least 80% of the gas in the enclosed casing, the temperature of the enclosed gas inside the cover approaches the controlled temperature and the proportion of the gas in the enclosed casing whose temperature changes with change in the environmental temperature is reduced, whereby change in the oscillation wavelength with change in the environmental temperature can be suppressed.

In accordance with the third aspect of the present invention, by fixing the optical elements forming the resonator to a support member of aluminum or aluminum alloy, the length of the resonator comes to change with change in the environmental temperature by a larger amount as compared with when the optical elements forming the resonator are fixed to a support member of copper as in the conventional solid state laser since the support member of aluminum or aluminum alloy deforms with change in the environmental temperature by a larger amount than that of copper. Since change in the oscillation wavelength due to the deformation of the support member (change in the length of the resonator) is reverse to that due to change of the refractive index of the enclosed gas, change in the oscillation wavelength can be suppressed by cancelling the latter by the former.

In accordance with the fourth aspect of the present invention, by reducing the thickness of the portion of the bottom plate at which the Peltier element is fixed to the bottom plate to not larger than 3 mm, deformation of the portion of the bottom plate is increased as compared with the conventional solid state laser where the thickness of the portion of the bottom plate is not smaller than 5 mm. Thus change in the oscillation wavelength can be suppressed for the same reason as in the third aspect of the present invention.

In the solid state lasers of the first to fourth aspects of the present invention, since fluctuation in the oscillation wavelength can be suppressed, fluctuation in the output power due to fluctuation in the oscillation wavelength can be also suppressed.

DESCRIPTION OF THE PREFERRED EMBODIMENTS

Figure 1:
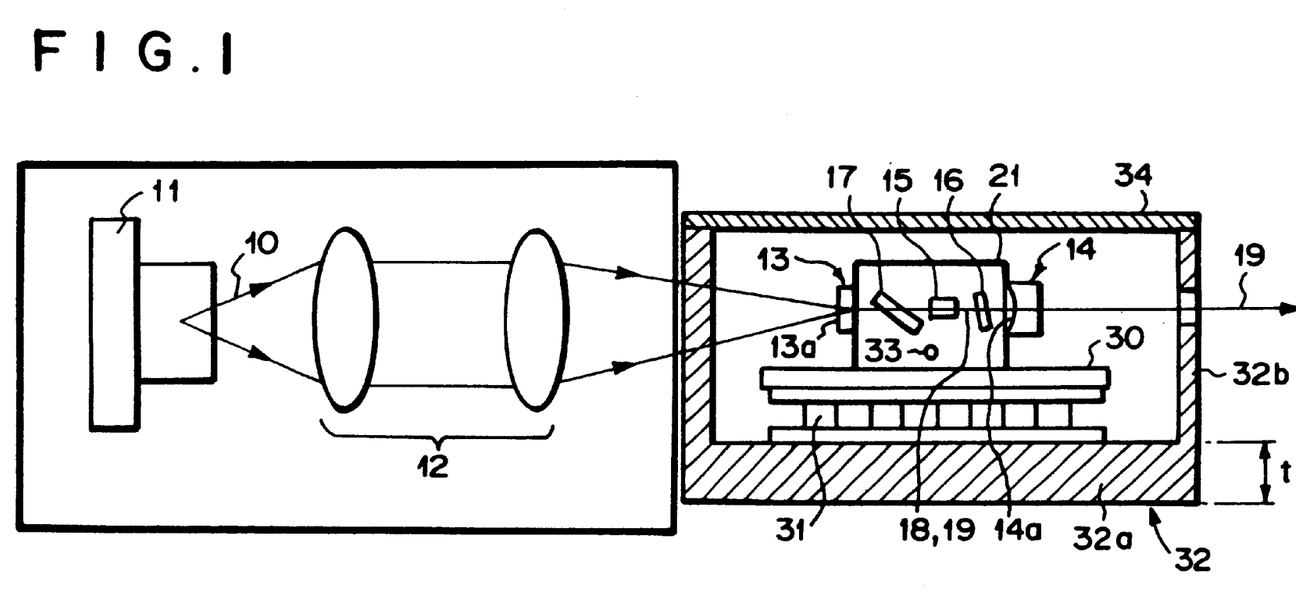
FIG. 1 is a schematic side view of a solid state laser in accordance with an embodiment of the present invention.

In FIG. 1, a laser-diode-pumped solid state laser in accordance with an embodiment of the present invention comprises a semiconductor laser 11 which produces a laser beam 10 as a pumping beam, a condenser lens 12 which condenses the laser beam 10, which is produced as divergent light, a YAG crystal 13 which is a solid laser medium doped with neodymium (Nd) (will be referred to as "Nd:YAG crystal 13", hereinbelow), and a resonator mirror 14 disposed forward of the Nd:YAG crystal 13 (on the side opposite to the semiconductor laser 11).

A Brewster plate 17, a $MgO:LiNbO_3$ ($LiNbO_3$ doped with MgO) crystal 15, which is a nonlinear optical material having periodic domain reversals, and an etalon 16 are disposed between the resonator mirror 14 and the Nd:YAG crystal 13 in this order from the Nd:YAG crystal side.

The Nd:YAG crystal 13, the $LiNbO_3$ crystal 15, the etalon 16, the Brewster plate 17 and the resonator mirror 14 are fixedly bonded to a copper block 21 and fixed to a bottom plate (package base) 32a of an enclosed casing 32 by way of a base plate 30 and a Peltier element 31. The portion formed by the optical elements fixed to the block 21 will be referred to as "the resonator portion", hereinbelow.

The semiconductor laser 11 is a broad area laser having an active layer about 50 μm wide and produces a laser beam 10 having a central wavelength of 809 nm. The condenser lens converges the laser beam 10 inside the Nd:YAG crystal 13.

Neodymium ions in the Nd:YAG crystal 13 are pumped by the laser beam 10 and the Nd:YAG crystal 13 thereby produces a laser beam having a wavelength of 1064 nm. The pumping light incident side end face 13a of the Nd:YAG crystal 13 is provided with a coating which is highly reflecting (a reflectivity of not lower than 99.9%) to light of 1064 nm and antireflecting (a transmittance of not lower than 93%) to pumping laser beam of 809 nm.

The mirror surface 14a of the resonator mirror 14 is provided with a coating which is highly reflecting to light of 1064 nm (a reflectivity of not lower than 99.9%) and antireflecting to light of 532 nm (a transmittance of not lower than 90%).

Thus the light beam of a wavelength of 1064 nm is confined between the surfaces 13a and 14a and oscillates. The laser beam 18 of 1064 nm thus produced impinges upon the $MgO:LiNbO_3$ crystal 15 and is converted into its second harmonic 19 having a wavelength of 532 nm equal to a half of the wavelength of the laser beam 18 by the $MgO:LiNbO_3$ crystal 15. The second harmonic 19 is mainly output from the resonator mirror 14.

In this particular embodiment, the Nd:YAG crystal 13 is 1 mm in thickness and the $MgO:LiNbO_3$ crystal 15 is 2 mm in length. The radius of curvature of the resonator mirror 14, which is a concave mirror, is 100 mm and the distance between the end face 13a of the Nd:YAG crystal 13 and the mirror surface 14a, which forms the resonator, is about 11 mm.

The etalon 16 comprises a synthetic quartz plate 0.3 mm thick and is inclined to the optical axis of the laser oscillation at a suitable angle in the range of 0.3 to 1°. The etalon 16 makes the oscillation mode of the laser beam 18 of a single longitudinal mode. The Brewster plate 17 is of a synthetic quartz plate 0.385 mm thick and functions as a polarization control element for controlling the direction of polarization of the laser beam 18.

The temperature in the resonator is detected by a thermistor 33 mounted on the resonator portion and the current to the Peltier element 31 is controlled by a temperature control circuit (not shown) according to the temperature detected by the thermistor 33 so that the temperature in the resonator is kept at a predetermined temperature.

The enclosed casing 32 is formed of Kovar (an alloy of Fe, Ni and Co), and the bottom plate (package base) 32a thereof is 6 mm in thickness. The package base 32a and the side wall portion 32b of the casing 32 are integrally formed and a cap 34 is mounted on the casing body formed of the base 32a and the side wall portion 32b after incorporation of the elements and wiring are completed. Then the cap 34 is fixed to the casing body by seam welding in dry nitrogen, thereby forming the enclosed casing 32.

The following experiments were carried out on the laser diode-pumped solid state laser having the basic structure described above and change in the oscillation wavelength was inspected.

Experiment 1

A plurality of the laser diode-pumped solid state lasers according to the embodiment described above which differed in the distance between the end face 13a of the Nd:YAG crystal 13 and the mirror surface 14a forming the resonator were prepared. Changes in the oscillation wavelength of the respective lasers with change in the environmental temperature (40° Cpp) were measured and compared.

Figure 2:
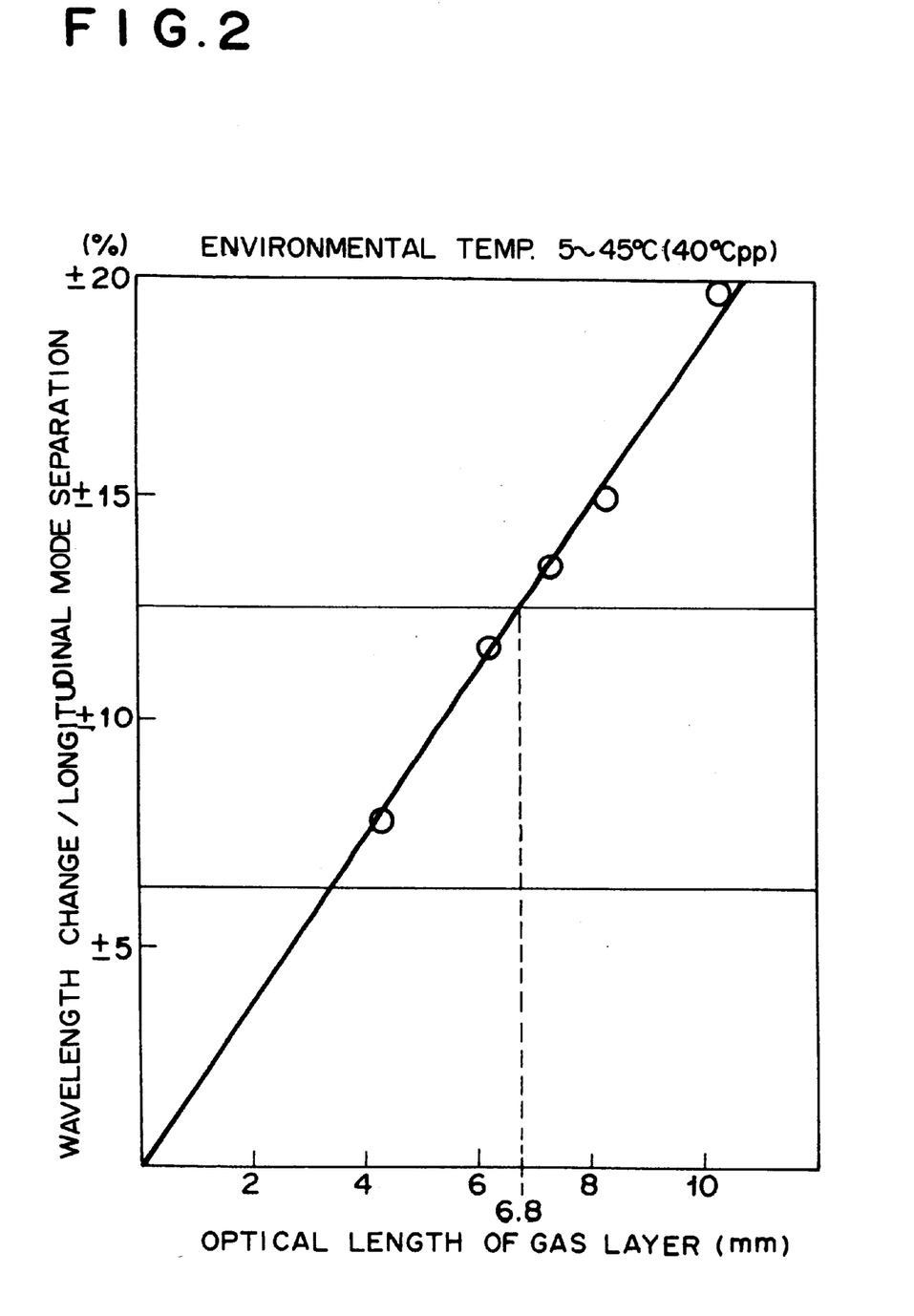
FIG. 2 is a graph showing the relation between the optical length of the gas layer in the resonator and the proportion of the change in the oscillation wavelength with change in the environmental temperature to the separations between the longitudinal modes.

The result was as shown in FIG. 2, where the abscissa represents the optical length of the gas layer in the resonator and the ordinate represents the proportion of the change in the oscillation wavelength with change in the environmental temperature to the separations between the longitudinal modes (will be referred to as "the wavelength change factor", hereinbelow).

As can be seen from FIG. 2, the wavelength change factor was substantially proportional to the optical length of the gas layer and was ±12.5% when the optical length of the gas layer was 6.8 mm. By extrapolation, the wavelength change factor should be ±25% when the optical length of the gas layer is 13.6 mm. The ratio of 13.6 mm to 1064 nm (the oscillation wavelength of the solid state laser) is about 13600 and by setting the ratio to be not larger than 13600, the change in the oscillation wavelength can be suppressed to not larger than ±25% of the separations between the longitudinal modes for change in the environmental temperature of 40° Cpp.

When the environmental temperature changes by 80° Cpp, the wavelength change factor is ±25% when the optical length of the gas layer is 6.8 mm and is ±12.5% when the optical length of the gas layer is 3.4 mm.

The solid state lasers used in this experiment was 1064 nm in the oscillation wavelength. The optical length ($\lambda$) of the gas layer at other oscillation wavelengths $\lambda$ can be derived according to formula optical length ($\lambda$) of the gas layer =L($\lambda$)×($\lambda$/1064)

wherein L($\lambda$) represents the optical length of the gas layer at 1064 nm.

Experiment 2

A plurality of the laser diode-pumped solid state lasers according to the embodiment described above which differed in the distance between the end face 13a of the Nd:YAG crystal 13 and the mirror surface 14a forming the resonator were prepared. The lasers were divided into two groups, one group being provided with a cover which enveloped 80% of the gas in the enclosed casing and the other group not provided with such a cover. The relation between the optical length of the gas layer and the wavelength change factor of the respective groups for change in the environmental temperature (40° Cpp) were measured and compared. The result was as shown in FIG. 3.

Figure 3:
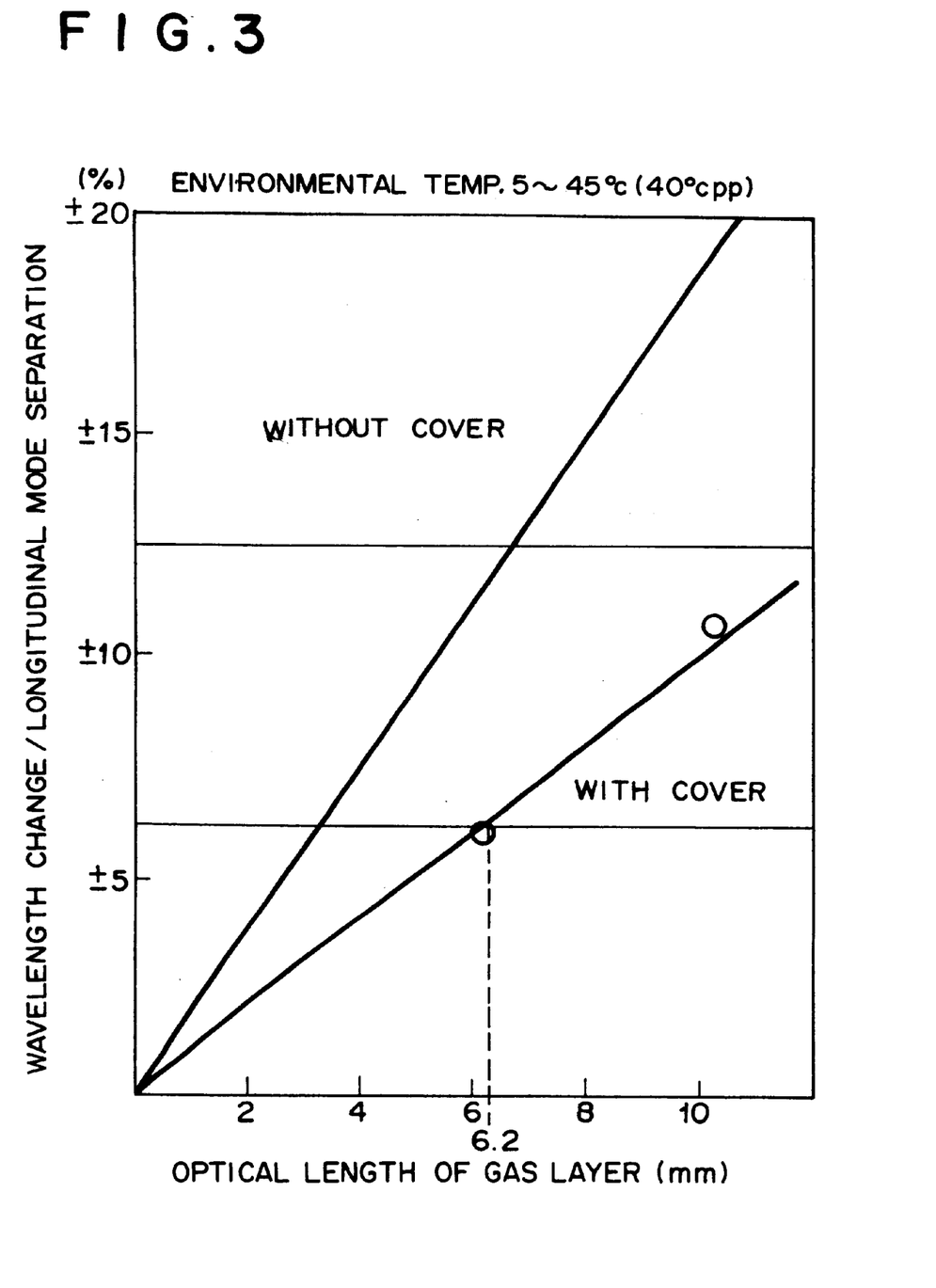
FIG. 3 is a graph showing the relation between the optical length of the gas layer in the resonator and the proportion of the change in the oscillation wavelength with change in the environmental temperature to the separations between the longitudinal modes when the cover is provided in the enclosed casing in comparison with that when no cover is provided in the enclosed casing.

As can be seen from FIG. 3, in the lasers with the cover, the change in the oscillation wavelength was only 50% of that in the lasers without cover. This is because the temperature of the enclosed gas inside the cover approaches the controlled temperature and the proportion of the gas in the enclosed casing whose temperature changes with change in the environmental temperature is reduced.

Experiment 3

A plurality of the laser diode-pumped solid state lasers according to the embodiment described above which differed in the distance between the end face 13a of the Nd:YAG crystal 13 and the mirror surface 14a forming the resonator were prepared. The lasers were divided into three groups, the thickness t of the package base 32a being 6 mm in one group, 3 mm in another group and 2 mm in the other group. The relation between the optical length of the gas layer and the wavelength change factor of the respective groups for change in the environmental temperature (40° Cpp) were measured and compared. The result was as shown in FIG. 4.

Figure 4:
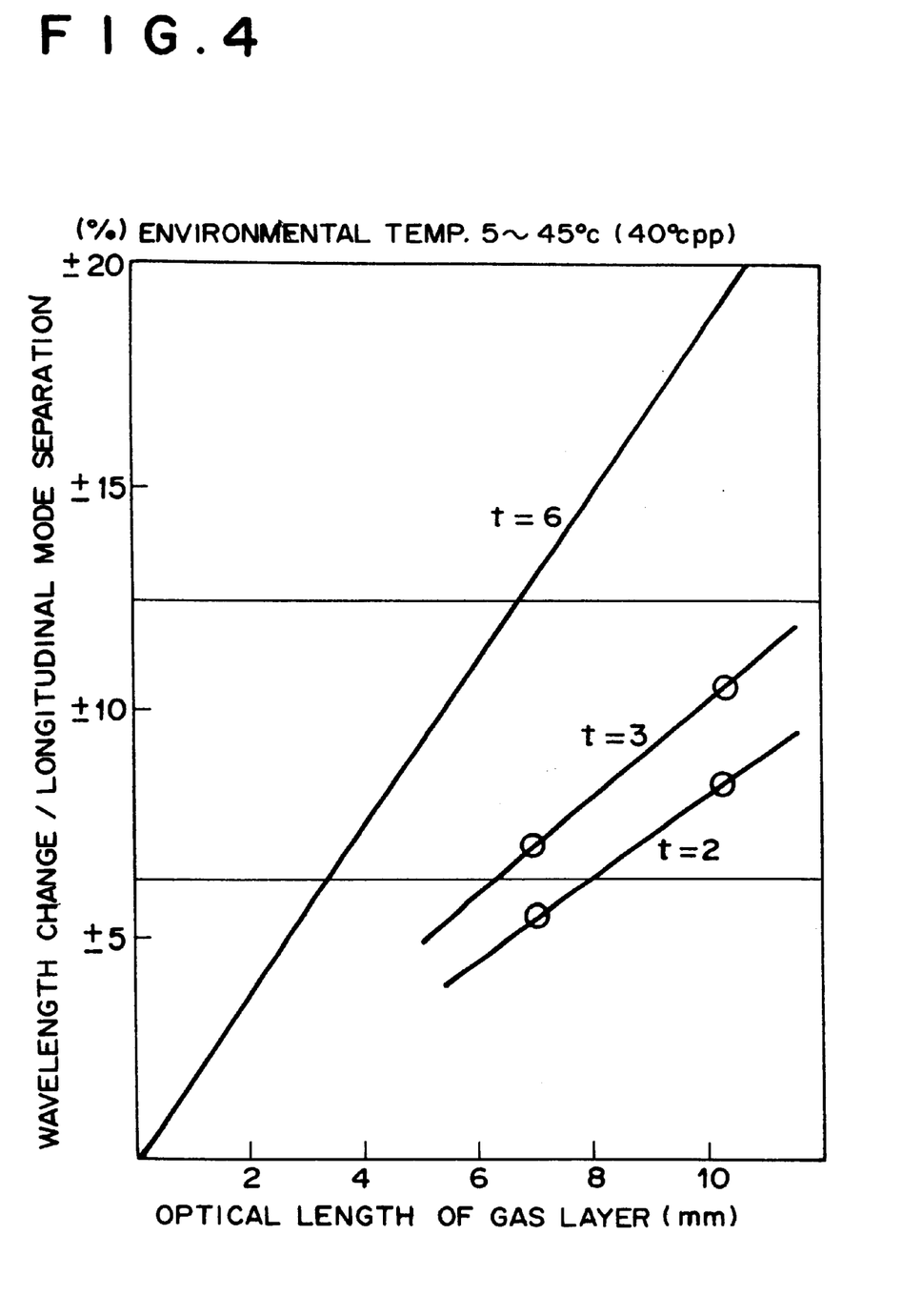
FIG. 4 is a graph showing the relation between the optical length of the gas layer in the resonator and the proportion of the change in the oscillation wavelength with change in the environmental temperature to the separations between the longitudinal modes for different thicknesses of the bottom plate of the enclosed casing.

As can be seen from FIG. 4, in the lasers where the thickness t of the package base 32a was 3 mm, the wavelength change factor was about 55% of that in the lasers where the thickness t of the package base 32a was 6 mm, and in the lasers where the thickness t of the package base 32a was 2 mm, the wavelength change factor was about 40% of that in the lasers where the thickness t of the package base 32a was 6 mm.

Experiment 4

A plurality of the laser diode-pumped solid state lasers which differed in the distance between the end face 13a of the Nd:YAG crystal 13 and the mirror surface 14a forming the resonator were prepared. The lasers were basically of the same arrangement as the laser shown in FIG. 1 but the block 21 and the like to which the resonator portion was fixed were formed of aluminum in place of copper. The lasers were divided into three groups, the thickness t of the package base 32a being 6 mm in one group, 3 mm in another group and 2 mm in the other group. The relation between the optical length of the gas layer and the wavelength change factor of the respective groups for change in the environmental temperature (40° Cpp) were measured and compared. The result was as shown in FIG. 5.

Figure 5:
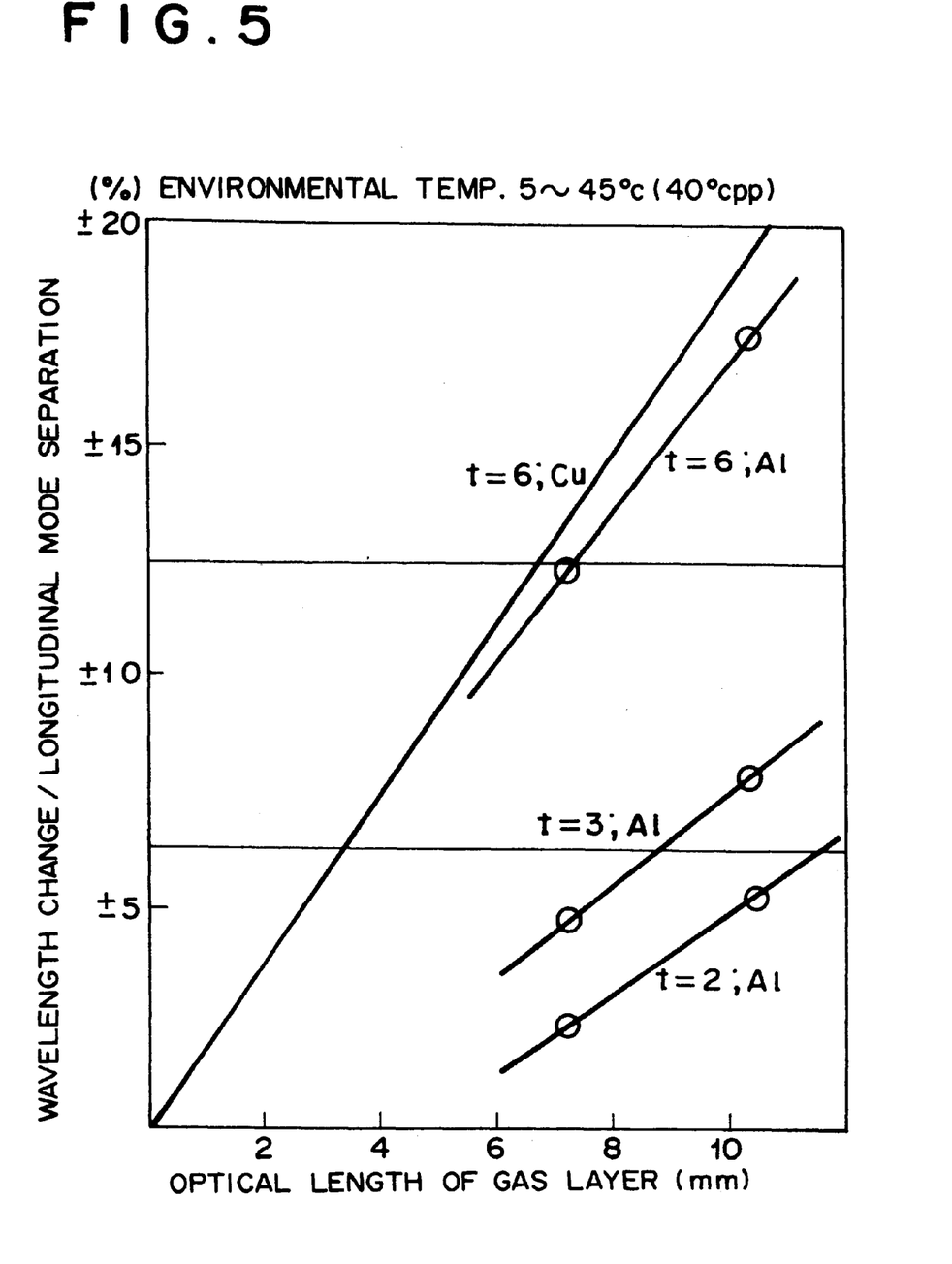
FIG. 5 is a graph showing the relation between the optical length of the gas layer in the resonator and the proportion of the change in the oscillation wavelength with change in the environmental temperature to the separations between the longitudinal modes for different combinations of the thickness of the bottom plate of the enclosed casing and the material of the support member to which the optical elements of the resonator are fixed.

As can be seen from comparison of FIGS. 4 and 5, when the thickness t of the package base 32a was 6 mm, switching the material the block 21 and the like from copper to aluminum less contributed to reduction of the wavelength change factor. To the contrast, by forming the block 21 and the like of aluminum in place of copper, the wavelength change factor was reduced to about ⅔ when the thickness t of the package base 32a was 3 mm and to about ⅓ the thickness t of the package base 32a was 2 nm.

Figure 6:
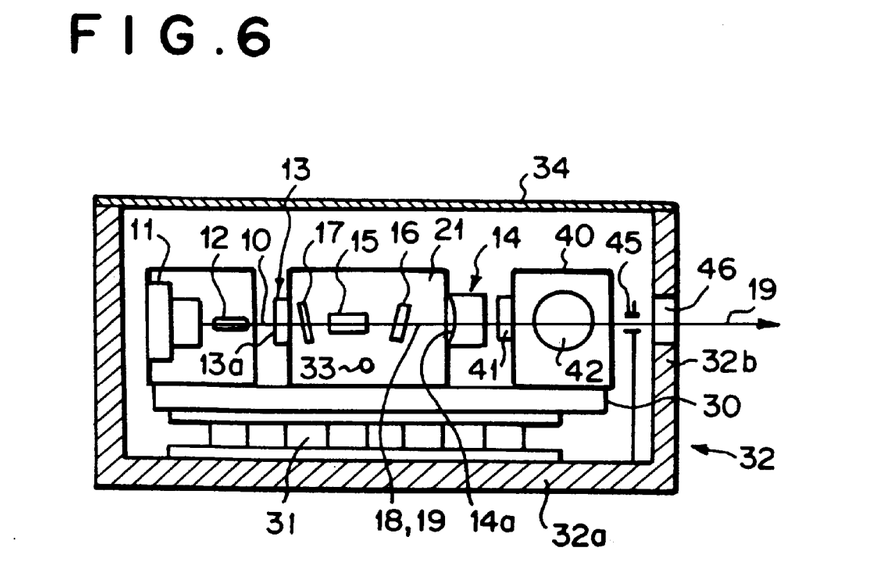
FIG. 6 is a schematic side view of a solid state laser in accordance with another embodiment of the present invention.

A laser diode-pumped solid state laser in accordance with another embodiment of the present invention will be described with reference to FIG. 6, hereinbelow. In FIG. 6, the elements analogous to those shown in FIG. 1 are given the same reference numerals and will not be described here.

With the arrangement shown in FIG. 6, neodymium ions in the Nd:YAG crystal 13 are pumped by the laser beam 10 having a central wavelength of 809 nm and the Nd:YVO$_4$ crystal 13 thereby produces a laser beam having a wavelength of 946 nm. The pumping light incident side end face 13a of the Nd:YAG crystal 13 is provided with a coating which is highly reflecting (a reflectivity of not lower than 99.9%) to light of 946 nm and antireflecting (a transmittance of not lower than 93%) to pumping laser beam of 809 nm.

The mirror surface 14a of the resonator mirror 14 is provided with a coating which is highly reflecting to light of 946 nm (a reflectivity of not lower than 99.9%) and antireflecting to light of 473 nm (a transmittance of not lower than 90%).

Thus the light beam of a wavelength of 946 nm is confined between the surfaces 13a and 14a and oscillates. The laser beam 18 of 946 nm thus produced impinges upon the MgO:LiNbO$_3$ crystal 15 and is converted into its second harmonic 19 having a wavelength of 473 nm equal to a half of the wavelength of the laser beam 18 by the MgO:LiNbO$_3$ crystal 15. The second harmonic 19 is mainly output from the resonator mirror 14.

The second harmonic 19 thus emitted from the resonator portion enters an APC portion. The APC portion comprises a filter 41 which absorbs both the laser beams 10 and 18, a partial reflecting mirror (not shown) which reflects a part of the second harmonic 19 in a direction perpendicular to the optical axis of the second harmonic 19, and a photodiode 42 which measures the amount of the part of the second harmonic 19 reflected by the partial reflecting mirror, and these elements are fixed to a single holder 40.

The second harmonic 19 passing through the APC portion travels through an aperture 45 and then emanates from the enclosed casing 32 through a window 46.

In this particular embodiment, the Nd:YAG crystal 13 is 1 mm in thickness and the MgO:LiNbO$_3$ crystal 15 is 2 mm in length. The radius of curvature of the resonator mirror 14, which is a concave mirror, is 20 mm and the distance between the end face 13a of the Nd:YAG crystal 13 and the mirror surface 14a, which forms the resonator, is about 9 mm.

The optical length of the gas layer in the resonator is 5.4 mm, the optical length of the resonator (the total of the products of the thickness of each of the components of the resonator including the gas layer and its refractive index) is 12.8 mm and the separation between the longitudinal modes is 0.035 nm. In this embodiment, the oscillation wavelength of the solid state laser is 946 nm, and the ratio of the optical length of the gas layer in the resonator to the oscillation wavelength of the solid state laser is about 5700 and is not larger than 13600.

The optical length of the gas layer in the resonator may be shortened by directing bonding together the optical elements in the resonator. However when an optical element such as a Brewster plate or an etalon which is inclined relative to the optical axis, it is difficult to apply such a method. Accordingly, in this embodiment, all the optical elements are mounted on a single block 21 in order to shorten the optical length of the gas layer in the resonator.

What is claimed is:

1. A solid state laser comprising a solid state laser crystal, a pumping source for pumping the laser crystal, a resonator, an enclosed casing which is filled with gas and in which the resonator is contained, and a temperature control means which keeps the resonator at a predetermined temperature, wherein the improvement comprises that the ratio of the optical length of the gas layer in the resonator to the oscillation wavelength of the solid state laser is not larger than 13600.

2. A solid state laser as defined in claim 1 in which the ratio of the optical length of the gas layer in the resonator to the oscillation wavelength of the solid state laser is not larger than 6800.

3. A solid state laser as defined in claim 2 in which the ratio of the optical length of the gas layer in the resonator to the oscillation wavelength of the solid state laser is not larger than 3400.

4. A solid state laser as defined in claim 1 in which a nonlinear optical element which converts the wavelength of the solid state laser beam is disposed in the resonator.

5. A solid state laser as defined in claim 1 further comprising an optical element disposed in the resonator inclined at an angle to the optical axis of the laser oscillation.

6. The solid state laser of claim 1, wherein the resonator comprises a plurality of optical elements which are bonded to a single base.

7. The solid state laser of claim 1, wherein the plurality of optical elements of the resonator are bonded together.

8. The solid state laser of claim 5, wherein the resonator comprises a plurality of light transmissive elements in addition to the optical element which is inclined to the optical axis of the laser oscillation, wherein the plurality of light transmissive elements and the optical element which is inclined are bonded to a single base.

* * * * *